July 1, 1941.  H. ANDERSON  2,247,797
MICROMETRIC GAUGE
Filed Dec. 30, 1940
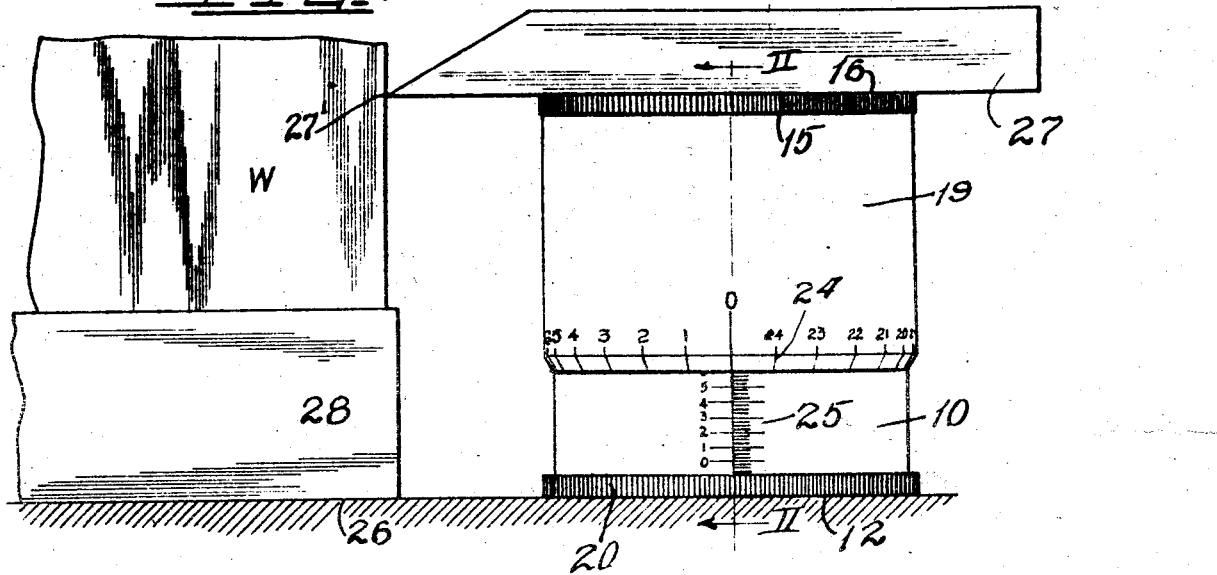
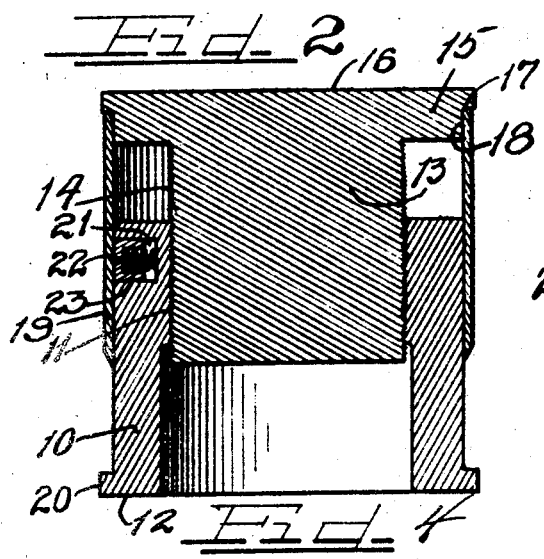
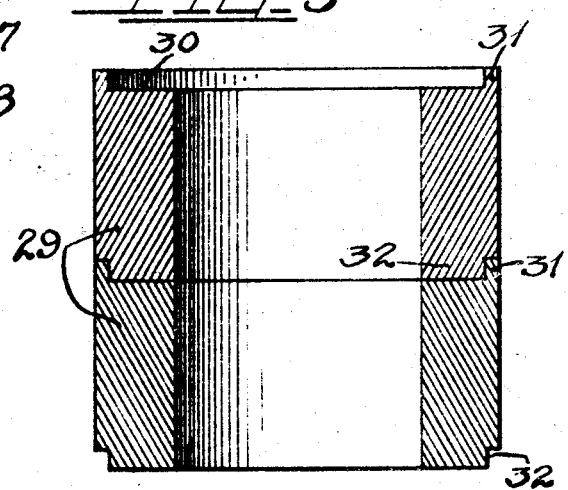
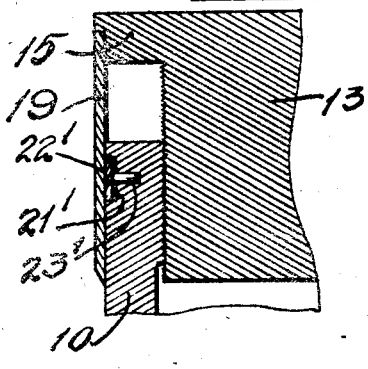
Inventor
Harry Anderson.

Patented July 1, 1941

2,247,797

UNITED STATES PATENT OFFICE 2,247,797

MICROMETRIC GAUGE

Harry Anderson, Valparaiso, Ind.

Application December 30, 1940, Serial No. 372,255

2 Claims. (Cl. 33—164)

My invention relates to micrometric gauge structure adapted particularly for the accurate gauging of height for the scribing of work pieces particularly in the tool and die making field.

An important object of the invention is to provide a compact scribing tool supporting unit or base comprising lower and upper concentric members having threaded interconnection for micrometric relative axial movement upon relative turning thereof, with the lower member having a flat seating surface and the upper member having a flat top surface parallel with the seating surface and on which a scribing tool may be moved in various directions for the scribing of a work piece.

A further object is to provide simple means in the form of elevating members having flat lower and upper parallel surfaces and of standard height for application below the gauge unit or below the work for proper relative locationing of the unit and the work piece for efficient scribing operation.

My invention also includes other features of structure and arrangement, and a practical embodiment of the features of my invention is disclosed on the drawing in which Figure 1 is a side elevation of the gauge unit or base structure;

Figure 2 is a vertical diametral section;

Figure 3 is an assembly of raise members, in diametral section, for application below the gauge unit for elevation thereof relative to work to be scribed; and Figure 4 shows a modified arrangement.

The gauge base or unit shown comprises the lower annular member 10 the upper portion of whose bore is of slightly decreased diameter and is internally threaded as indicated at 11. The lower surface 12 of the member 10 is flat and in a plane at right angles with the axis of the member.

The upper member 13 is shown in the form of a cylindrical plug having the exterior threading 14 for engagement with the threading 11 of the lower member 10. The upper end of the plug 13 is of increased diameter to provide a flange 15 for overhanging the upper end of the member 10, and the top surface 16 of the plug and flange is flat and in a plane at right angles with the plug axis, and so as to be parallel with the seating surface 12 of the member 10.

The lower outer corner of the flange part 15 of the plug 13 has the annular recess 17 providing the annular shoulder 18 for receiving the upper end of a skirt or sleeve 19 which surrounds the member 10 and is secured at its upper end in the recess 17, as by soldering, so as to move with the plug member 13. The member 19 at its lower end may be provided with an annular flange 20, this flange and the portion of the flange 15 above the recess 17 on the plug member 13 are preferably knurled so that the gauge members may be readily relatively turned for setting of the gauge.

Means are provided to frictionally hold the members 10 and 13 in set position. As shown on Figure 2, radially extending pockets 21, preferably three, equally spaced circumferentially, are provided in the member 10 and each pocket contains a friction button 22 backed by a spring 23 for friction engagement with the sleeve 19 so as to frictionally hold the members 10 and 13 in set position.

In the modified arrangement shown on Figure 4, the member 10 has a circumferentially extending channel 21' for an expansible friction ring 22' of fibre or other suitable material, pins 23' holding the ring against rotational movement. The expansion pressure of the ring against the sleeve 19 will frictionally hold the members 10 and 13 in set position.

Upon relative turning of the gauge members they will be correspondingly axially displaced. For example the threading 11 and 14 could be forty threads per inch so that for each rotation of one member relative to the other, the members will be axially relatively moved $\frac{1}{40}$ of an inch. Along its lower end the sleeve 19 could be provided with a scale 24 of 25 indication lines circumferentially equalled spaced, so that upon turning of the upper member 13 relative to the lower member 10 a distance of one of the scale divisions, the member 13 will be moved axially a distance of .001 of an inch relative to the member 10. On the outside of the member 10 a vertical scale 25 could be provided of one inch or more in length, each inch being divided into tenths and each tenth being subdivided into four spaces so that each of the small spaces would indicate $\frac{1}{40}$ of an inch which will be the distance of axial movement of the member 13 for each complete rotational movement thereof. When the two members are fully together, the lower edge of the sleeve 19 will coincide with the zero line of the scale 25, with the zero point on the scale 24 coinciding with the zero point on the scale 25.

When the gauge is to be used, it is set on a flat topped bed or plate 26 on which the work piece W to be scribed is also mounted. A scribing tool 27 is then placed on the top surface 16 of the gauge unit for scribing of the work piece. This scribing tool is made of a piece of hardened steel and is absolutely flat on its under side clear out to the scribing point 27', so that the point will always be in the plane of the lower side of the tool and the tool supporting surface which plane is always parallel with the seating plane 12 of the lower gauge unit member 10 which engages the surface or supporting plate 26. For scribing or marking of the work piece W, the tool 27 may be moved in various directions along and in engagement with the supporting surface 16, or the entire gauge unit may be moved with the tool. On Figure 1 the scribing tool is shown in scribing position for marking the work piece, the upper gauge member 13 being at the zero position of the scale 24, and now if it is desired to mark the work piece at a higher or a lower point, the gauge element is turned for the desired height of the markings, the turning of the member 13 a distance equal to any number of the divisions on scale 24 resulting in a corresponding number of .001 inch movements vertically of the member 13 and of the tool point 27' relative to the work piece, so that very accurate gauging may be accomplished.

In order to facilitate proper application of the gauge structure to work pieces of different size, raise elements may be provided for elevating the gauge unit where the work piece is comparatively large, or for elevating the work piece, where the work piece is relatively small. Figure 1 shows a raise element 28 below the work piece W, and these raise elements may be ordinary blocks of metal of standard height, such as one inch. For the gauge unit, annular raise elements 29 may be employed. These raise elements are recessed at their upper ends to provide an annular flat seat for the lower end of the gauge member 10, with the seat surrounded by a retaining flange 31 for holding the gauge unit against transverse displacement. A number of such raising units may be stacked together for elevating the gauge unit, and in order to hold the stacked units against displacement, each unit has the annular recess 32 at its lower end for engaging within the flange 31 of the next lower unit, as shown on Figure 3. The seating surface 30 and the lower end surface of each unit are parallel and at right angles with the unit axis so that when one or more units are applied under the gauge, the tool 27 will be horizontally disposed on top of the gauge parallel with the surface of the supporting plate 26. The raise units are also preferably of standard height, say one inch, so that the workman will know exactly how high the gauge unit is elevated.

I thus provide a simple, compact and efficient micrometric gauge base or unit for accurate setting and manipulation of a scribing tool for the scribing of work pieces, and simple means for quickly and readily elevating the gauge unit relative to the work piece. I do not, however, desire to be limited to the exact construction and arrangement shown and described as changes and modifications may be made without departing from the scope of the invention.

I claim as follows:

1. A gauge base for supporting a scribing tool comprising a lower annular member having internal threading, an upper member concentric with and engageable in said annular member and having exterior threading for engagement with internal threading whereby relative rotary movement of said members will effect relative axial movement thereof, a sleeve depending from said upper member and surrounding said lower member, scale indications extending circumferentially around said sleeve for cooperation with indicating points on said lower member to indicate the distances of relative axial movement of said members, said lower member having a circumferentially extending channel, an expansible friction ring in said channel pressing radially against the inner side of said sleeve whereby said members are frictionally held in set position, and means holding said friction ring against rotational movement in said channel.

2. A gauge base for supporting a scribing tool comprising a lower annular member having internal threading, an upper member concentric with and engageable in said annular member and having exterior threading for engagement with internal threading whereby relative rotary movement of said members will effect relative axial movement thereof, a sleeve depending from said upper member and surrounding said lower member, scale indications extending circumferentially around said sleeve for cooperation with indicating points on said lower member to indicate the distances of relative axial movement of said members, said lower member having a circumferentially extending channel, an expansible ring of non-metallic material in said channel exerting radial pressure against the inner side of said sleeve whereby said members will be frictionally held in set position, said lower member having radially extending pockets, and pins secured to said ring and extending into said pockets for holding said ring against rotational movement in said channel.

HARRY ANDERSON.